US005841430A

United States Patent [19]
Kurikko

[11] Patent Number: 5,841,430
[45] Date of Patent: Nov. 24, 1998

[54] DIGITAL VIDEO DISPLAY HAVING ANALOG INTERFACE WITH CLOCK AND VIDEO SIGNALS SYNCHRONIZED TO REDUCE IMAGE FLICKER

[75] Inventor: Jarmo Kurikko, Espoo, Finland

[73] Assignee: ICL Personal Systems OY, Helsinki, Finland

[21] Appl. No.: 881,793

[22] Filed: Jun. 24, 1997

Related U.S. Application Data

[63] Continuation of Ser. No. 256,751, filed as PCT/FI93/00031, Jan. 29, 1993 published as WO93/15497, Aug. 5, 1993, abandoned.

[30] Foreign Application Priority Data

Jan. 30, 1992 [FI] Finland ..................... 920416

[51] Int. Cl.$^6$ ................... G09G 5/00; G09G 3/36
[52] U.S. Cl. ................... 345/213; 345/3; 345/99
[58] Field of Search ................... 345/3, 99, 132, 345/147, 213, 154, 100; 348/790, 792, 793, 474, 500, 521, 522, 540, 800

[56] References Cited

U.S. PATENT DOCUMENTS

| | | | |
|---|---|---|---|
| 3,649,750 | 3/1972 | Gibson | 348/526 |
| 4,760,387 | 7/1988 | Ishii et al. | 345/3 |
| 4,860,246 | 8/1989 | Inoue | 345/3 |
| 4,926,166 | 5/1990 | Fujisawa et al. | 345/3 |
| 4,977,446 | 12/1990 | Shiomi et al. | 348/747 |
| 4,998,100 | 3/1991 | Ishii | 345/3 |
| 5,068,732 | 11/1991 | Satoh | 348/748 |
| 5,121,440 | 6/1992 | Ballard et al. | 382/220 |
| 5,140,427 | 8/1992 | Nakane et al. | 348/759 |
| 5,172,221 | 12/1992 | Ko | 348/761 |
| 5,285,192 | 2/1994 | Johary et al. | 345/3 |
| 5,293,485 | 3/1994 | Zenda | 345/3 |
| 5,309,168 | 5/1994 | Itoh et al. | 345/3 |
| 5,389,859 | 2/1995 | Stesson et al. | 315/370 |
| 5,400,053 | 3/1995 | Johary et al. | 345/147 |
| 5,479,184 | 12/1995 | Tokumitsu | 345/3 |
| 5,508,714 | 4/1996 | Zenda | 345/3 |
| 5,515,068 | 5/1996 | Uragami et al. | 345/3 |
| 5,579,025 | 11/1996 | Itoh | 345/3 |
| 5,610,621 | 3/1997 | Itoh et al. | 345/3 |
| 5,673,058 | 9/1997 | Uragami et al. | 345/3 |

FOREIGN PATENT DOCUMENTS 0 269 199 A2  6/1967  European Pat. Off. ......... G09G 3/20

*Primary Examiner*—Jeffery Brier
*Assistant Examiner*—Paul A. Bell
*Attorney, Agent, or Firm*—Fitch, Even, Tabin & Flannery

[57] ABSTRACT

An analog video interface for a digital video display, comprising an analog video input for receiving at least one analog video signal with composite or separate horizontal and vertical deflection signals; digitizing apparatus for digitizing the analog video signal; apparatus for generating a basic clock signal having a frequency at least n times a desired video frequency, where $n \geq 1$ and for generating control signals for the digital display and a sampling clock signal for the digitizing means in synchronization with the basic clock signal. The video interface further includes determining the actual video frequency of the analog video signal from the actual received video signals and a programmable frequency synthesizer responsive to the actual video frequency for synthesizing the basic clock signal having a frequency at least n times the determined actual video frequency where $n \geq 1$.

18 Claims, 7 Drawing Sheets

DIGITAL VIDEO DISPLAY HAVING ANALOG INTERFACE WITH CLOCK AND VIDEO SIGNALS SYNCHRONIZED TO REDUCE IMAGE FLICKER

This application is a continuation of application Ser. No. 08/256,751, filed as PCT/FI93/00031, Jan. 29, 1993 published as WO93/15497, Aug. 5, 1993, abandoned.

BACKGROUND OF THE INVENTION

The invention relates to an analog video interface for a digital video display device, comprising an analog video input for receiving at least one analog video signal with composite or separate horizontal and vertical deflection signals; digitizing means for digitizing said at least one analog video signal; means for generating a basic clock signal having a frequency at least n times a desired video frequency, where n>1; means for generating control signals for the digital display and a sampling clock signal for the digitizing means in synchronization with the basic clock signal.

Computer graphic display systems provided with e.g. a VGA display adapter usually employ a monochrome or colour cathode-ray tube display controlled by analog video signals (the analog voltage represents directly the brightness of the pixels of different colours). Most laptop computers employ digital liquid crystal display (LCD) panels. In certain special models of desktop computers (PS), attempts have been made to replace the CRT display with a digital LCD, plasma or electroluminescence (EL) panel.

Digital display panels require a parallel digital control, which means that the number of required control signal lines increases with the amount of colour information transferred to the screen. Frame rate control (FRC) and dithering aim at achieving the same effect with a smaller number of control signals (i.e. without increasing the number of signal lines) by processing and pulsing the image information. These techniques usually cause flickering in the image. The great number of lines is easy to place by using a so-called flat cable within the laptop computer, whereas the display panel is positioned in a separate housing in larger desktop computers, and the image information is transferred to the display panel through a separate external video cable. When the number of signal lines increases, the video cable becomes stiffer and takes more space, which is a major disadvantage in view of the use of the display. In addition, different display panels require different interfaces for the signal lines or even different control and timing signals to operate. This would require the use of different cables for different display panels. In addition, the positioning of the image on the screen varies from one panel to another and may even require different timings for proper operation. Different panels support different numbers of colours, deviating from each other in this respect too (cf. the number of digital signal lines). Furthermore, the digital signals of the video cables easily interfere with the environment (RFI, EMI, EMC).

Digital signals in digital display panels require a nonstandard display adapter with interfaces deviating from the conventional analog video interface. For the time being, display adapter circuits supporting the digital display panel are not produced on any larger scale, wherefore they are more expensive than mass-produced circuits supporting solely the analog cathode ray tube.

As appears from the above, a wider use of digital LCD, plasma or EL displays is greatly limited by the fact that the control signals, interfaces and display adapters supporting them deviate both from each other and especially from conventional display adapters (such as VGA) established as de facto standards and associated interfaces, which are used in most computer equipments. Accordingly, there is an apparent need to be able to control a digital display panel e.g. by a VGA display adapter via an analog video interface complying with the present standards. This, in turn, involves that an interfacing equipment has to be provided in association with the digital display panel to digitize the analog video signal and generate control signals for each particular display panel. This, however, involves some major problems.

EP 0 269 199 A discloses an LCD display, wherein a fixed basic clock frequency is generated locally. This basic clock frequency is a multiple of the desired video frequency. Then a control pulse is provided which is synchronized with the incoming horizontal synchronizing signal and the basic clock. A sampling clock is obtained by dividing the basic clock by the control pulse.

However, to operate properly, a digital display panel requires a clock signal appropriately and accurately phased with the analog video signal, as otherwise there may easily occur flickering in the image displayed on the screen. Similarly, the sampling frequency must always be as close as possible to the video frequency of the used display adapter. Although the video frequencies of e.g. the VGA display adapters have values complying with the de facto standards, they are not always observed accurately in the adapters so that it is very difficult to retain the required synchronization over the entire image area of the digital display panel. In addition, the video frequency of the display adapter does not remain constant but may roam, though within relatively narrow limits. Therefore the display of EP 0 269 199 A does not ensure high image quality since the video frequencies of the video source and the display may differ substantially from each other. One easy solution to the problem would be to supply the required clock signal directly from the display adapter through a cable. This, however, results in incompatibility with a display adapter complying with the de facto standard as the cable connection of such a compatible display adapter does not contain a video clock signal. In addition, interference problems easily occur when a radio-frequency clock signal of 25 to 30 MHz is transferred through the video cable.

SUMMARY OF THE INVENTION

The object of the present invention is to provide an analog video interface for a digital display device, which is compatible with a desired widely-used analog display adapter and the cable connection thereof while enabling a flicker-free image of high quality on the digital display panel.

This is achieved by means of an analog video interface for a digital video display of the type described in the introduction, which according to the invention is characterized in that said display further comprises means for determining the actual video frequency of the analog video signal on the basis of said received signals; said means for generating the basic clock signal comprising a programmable frequency synthesizer means responsive to said determining means for synthesizing the basic clock of a frequency which is at least n times said determined actual video frequency, where $n \geq 1$.

In the invention, a synthesized clock signal is utilized in place of the fixed clock signal and sampling clock of the digital display panel so that the frequency of the synthesized clock signal is adjusted in accordance with the actual video frequency of the video signal received. To determine the actual video frequency of the received video signal with sufficient accuracy, the video interface according to the invention calculates the video frequency on the basis of the duration of the received horizontal or vertical deflection period and the video clock periods (pixels) in the deflection period for each specific display resolution. Preferably, a basic clock having a frequency which is a multiple of the actual video frequency is synthesized on the basis of the calculated actual video frequency, and the sampling clock and all the control signals of the digital display are derived from the basic clock frequency. A quadruple basic clock frequency (n=4) is particularly advantageous as the Inventor has discovered that, to obtain a stable interference-free image (without flickering of pixels) on the screen, the sampling clock period must not deviate from the video clock period of the received analog video signal by more than ¼ of the video clock period. In addition, the sampling instant always has to coincide with the stable portion of the video signal, which prevents the quantizing error and provides a stable flicker-free image on the screen. If the sampling time coincides with the time of change of the video signal, flickering or incorrect image information appears on the screen. By the present method the sampling clock and all display control signals can be synchronized with the received video signal with a sufficient accuracy. The sampling clock and the video clock of the digital display are easy to obtain by dividing the basic clock frequency by n, e.g. by 4. Correspondingly, the horizontal and vertical deflection signals required by the display and other possible control signals and pulses can each be formed by software to contain a number of basic clock periods determined by register parameters. So the video interface according to the invention enables the timing of all signals to be adjusted by software in accordance with the requirements of the display adapter (video signal) and the digital display used. The generated horizontal deflection signal is easy to synchronize instantaneously with the received horizontal deflection signal by increasing or decreasing the number of basic clock periods contained in the horizontal deflection period (synchronizing pulse). By generating two short horizontal synchronizing pulses during each horizontal deflection period, interlaced scanning can be effected in a simple manner on the digital display. Correspondingly, when the display adapter is in the character mode, the image can be stretched in the vertical direction by generating more than one horizontal synchronizing pulses during some of the horizontal deflection periods, thus producing additional empty lines between the character lines. Furthermore, in the character mode of the display adapter, where there are usually 720 pixels per horizontal line, the video signal can be outputted with acceptable quality by a digital display panel having 640 pixels per horizontal line by omitting every ninth sampling clock pulse and the corresponding video clock pulse of the digital display, as a result of which every ninth pixel of the video signal will not be displayed on the screen.

In the video interface according to the invention, the brightness can be adjusted on the screen by varying the voltage level of the lower digitizing limit of the video signal while maintaining the size of the voltage range to be digitized unchanged or by controlling the operation of the inverter of background light. To adjust the contrast, the upper digitizing limit is varied and the lower limit is kept constant. In addition, the brightness, contrast, colour and/or word length corrections required by the properties of the digital video display to be controlled can be performed on the digitized video data nearly arbitrarily by means of a look-up type conversion memory provided after the digitizing means.

By means of the video interface according to the invention, various digital monochrome and colour display panels (LCD, TFT LCD, EL) can be interfaced by means of an analog interface complying with the de facto standard and a flexible standard video cable to standard VGA adapters and other analog display adapters (such as 8514/A, XGA, multimedia adapters). The video interface according to the invention is thus independent of the display adapter (and nearly independent of the resolution) and it offers compatibility not only with 640-pixel display modes but also with 720-pixel character modes. Due to its internal digital connection the interface can be specially designed for the display panel of each manufacturer. In addition, due to the conversion memory, the contrast and the brightness can be adjusted by software even specifically for each user or application, and the colour scale of the display panel can be corrected (gamma correction) for different panels, or the user can define the colour scale.

BRIEF DESCRIPTION OF THE DRAWINGS

In the following the invention will be described in more detail by means of illustrating embodiments with reference to the attached drawings, in which.

DETAILED DESCRIPTION

The invention can be applied in the control of any display device controllable by a digital video signal. Such a display device may be e.g. a liquid crystal display, a plasma display, an electro-luminescence display, etc.

Figure 1:
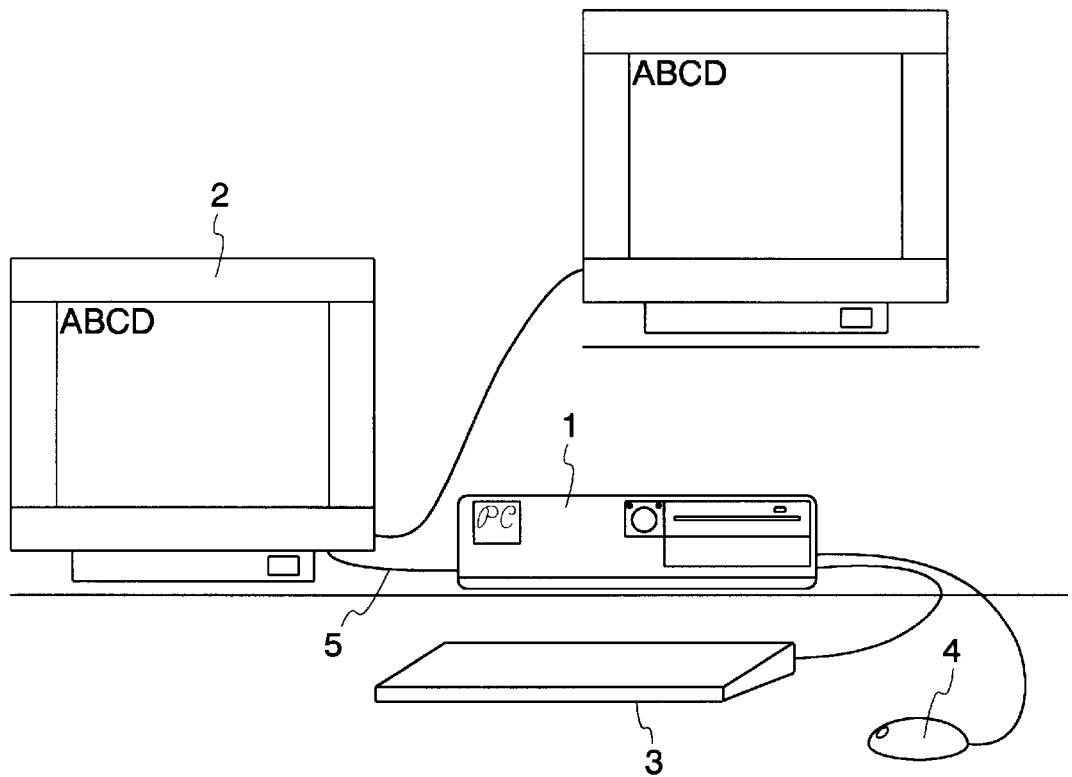
FIG. 1 is a block diagram illustrating a computer display system in which the video interface according to the invention is applicable.

FIG. 1 shows a computer system in which the invention can be applied. The computer system comprises a personal computer 1 (PC) to which a keyboard 3, a mouse 4 and a display device 2 can be connected. The PC 1 contains a display adapter which generates a video signal which may consist of several different physical signals and which is applied to the display device 2 through a video cable 5.

Figure 2:
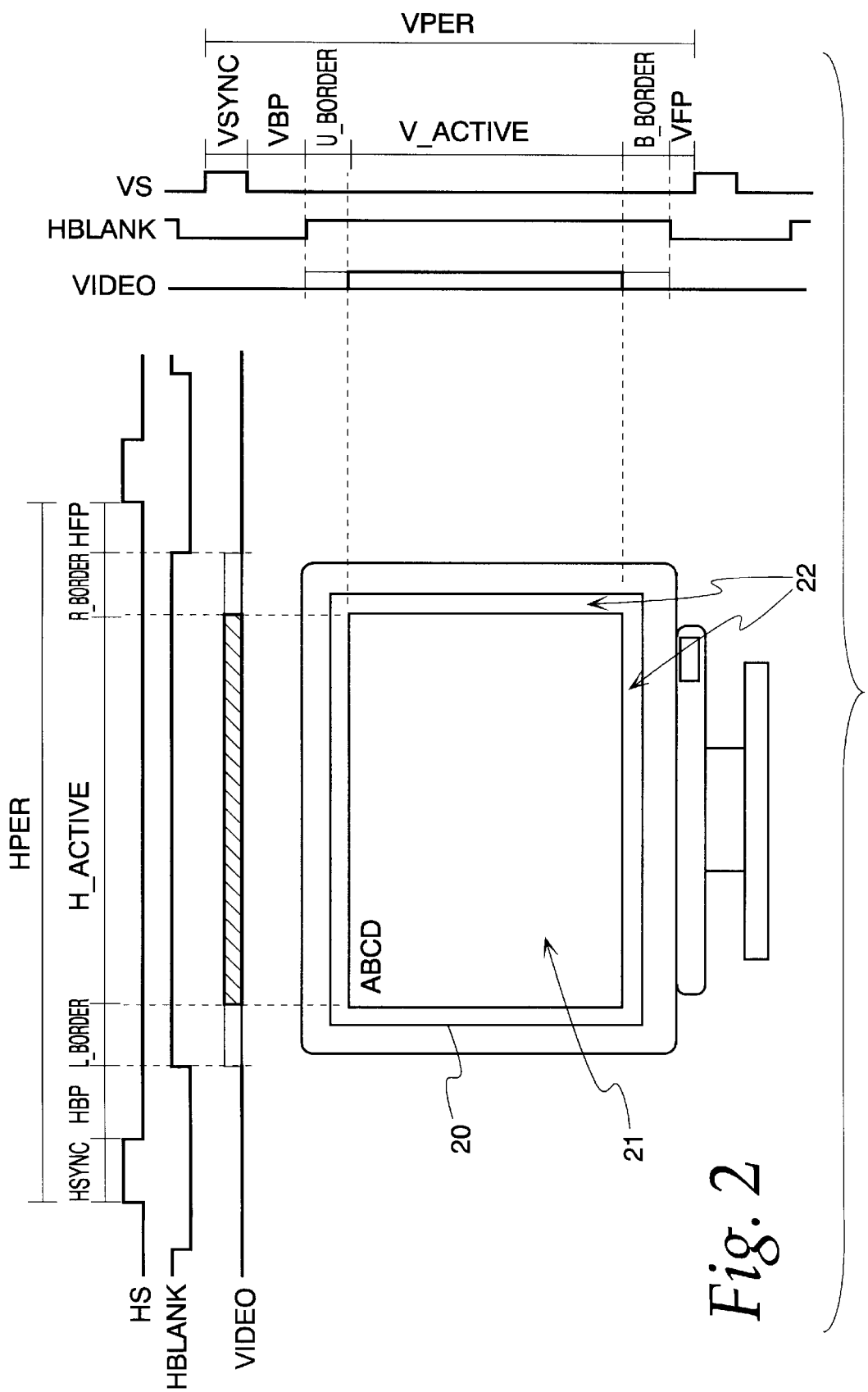
FIG. 2 shows the screen of a video display device, illustrating how the horizontal and vertical synchronizing signals of the video signal position the image on the screen.

FIG. 2 illustrates deflection or control signals for the video signal and their influence on the positioning of the image on the screen of the cathode ray tube. A horizontal line or horizontal deflection period HPER means a period during which one horizontal line is scanned from the left to the right across the screen and back to the start of the next horizontal line. The HPER comprises an active display period $H_{ACTIVE}$, which defines an active image area 21 on the screen, and a blanking period HBLANK, which comprises at least a front porch HFP, a horizontal synchronizing pulse HSYNC and a back porch HBP. The retrace of the electron beam to the start of the next line takes place during the blanking period HBLANK. Correspondingly, an image or vertical deflection period VPER comprises a display period $V_{ACTIVE}$ and a blanking period VBLANK which contains at least a front porch VFP, a vertical synchronizing pulse VSYNC and a back porch VBP. All the above-mentioned control periods of vertical deflection are formed of the multiples of the horizontal deflection period HPER, the number of the multiples being determined in each particular case by programmable control parameters, as will be described below.

The durations of the display periods $H_{ACTIVE}$ and $V_{ACTIVE}$ in relation to the periods HPER and VPER usually determine the width and height of the displayed image, i.e. the image size. The positions of the synchronizing pulses HSYNC and VSYNC in relation to the respective display periods $H_{ACTIVE}$ and $V_{ACTIVE}$ determine the position of the image in the horizontal and vertical direction.

The video frequency means the frequency of the video dot clock, i.e. the video clock, whereby one video clock period is the time required to display one pixel on the screen. The resolution is the number of the video periods in the period $H_{ACTIVE}$ in the horizontal direction, and the number of the periods HPER of the period $V_{ACTIVE}$ in the vertical direction.

In most modern personal computers (such as IBM PC compatible) a VGA (Video Graphics Array) display adapter has replaced the former EGA, CGA, MDA and HGC display adapters. Although the video interface according to the invention can, in practice, be applied to any display adapter, the VGA adapters and the more recent adapters (such as XGA, 8514/A) are more interesting in view of the compatibility to be obtained by the invention, wherefore the invention will be described below by using these as examples.

Figure 3:
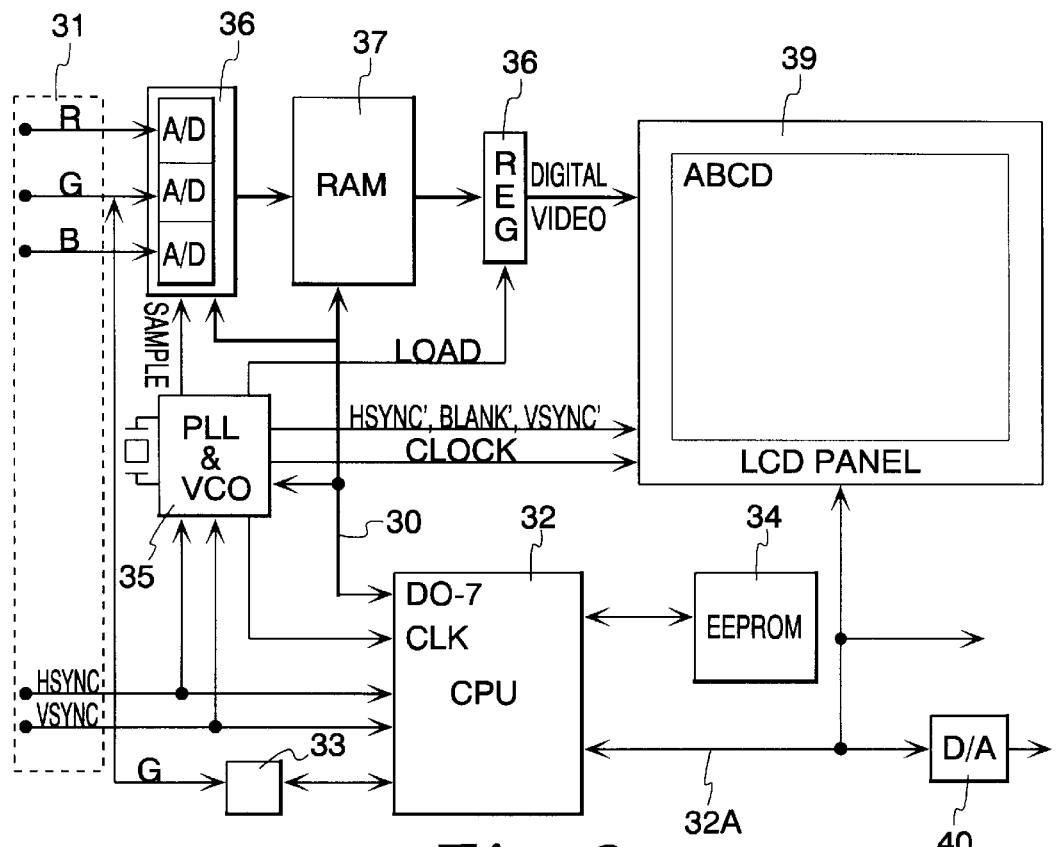
FIG. 3 is a block diagram illustrating an analog video interface according to the invention.

FIG. 3 shows an interfacing equipment according to the invention for connecting a digital LCD display panel to an analog video signal. The principle of the equipment is to digitize the received analog video signals in real time and generate appropriate timing signals for the display panel, so that the digitized video signals can be transferred in serial form to the electronics of the display panel. By means of the video interface according to the invention, all display modes of a VGA display adapter of the de facto standard can be effected by a digital LCD panel similarly as on the screen of an analog CRT display shown in FIG. 2. The compatible VGA display adapter is typically able to produce a character mode of a 720×400 resolution and a graphics mode of a 640×480 resolution (the most widely used VGA display modes).

The equipment of FIG. 3 is divided into several blocks on functional grounds. These blocks are an analog video input 31, a CPU microadapter 32, a communication channel interface circuit 33, an EEPROM memory 34, a control circuit 35, A/D conversion circuits 36, a conversion memory 37, an output buffer 38 and an LC display panel 39.

The video input 31 is mainly intended to be connected to a VGA display adapter of the de facto standard, the video interface of the VGA adapter employing the signals of Table 1 for the video transfer.

TABLE 1

Signal interface of a VGA display adapter

| SIGNAL | NAME | DESCRIPTION |
|---|---|---|
| 1 | R | Analog control signal for red colour. Used only with a colour display device. |
| 2 | G | Analog control signal for green colour or for monochrome level. Monochrome-level control is used only with a monochrome display. |
| 3 | B | Analog control signal for blue colour. Used only with a colour display device. |
| 4 | ID2 | Identification signal 2 for a display device. |
| 5 | Reserved (gnd) | Reserved (grounding) |
| 6 | R-Return | Grounding of red analog signal (pin 1). Used only with a colour display device. |
| 7 | G-Return | Grounding of green colour or monochrome level signal. |
| 8 | B-Return | Grounding signal of blue colour. Used only with a colour display device. |
| 9 | Key | Coding (the pin hole of the connector blocked). |
| 10 | GND | Grounding of digital signals. |
| 11 | ID0 | Display device identif. signal 0 |
| 12 | ID1 | Display device identif. signal 1 |
| 13 | HSYNC | Horizontal deflection signal for the display device |
| 14 | VSYNC | Vertical deflection signal for the display device |
| 15 | Reserved | Reserved |

In the preferred embodiment of the equipment according to the invention, only the R, G and B video signals (0 to 0.7 V) and the TTL-level horizontal and vertical deflection signals HSYNC and VSYNC of the signals of Table 1 are utilized. The analog video signals R, G and B are applied to separate A/D converters 36. The received horizontal deflection signals HSYNC and VSYNC are applied to the control circuit 35 and the CPU 32.

The CPU controls and initiates the operations of the entire equipment and selects the right display mode. In addition, the CPU 32 may communicate with the central unit 1 of the PC (FIG. 1) according to the principles disclosed in FI Patent Application 914435 through a standard VGA video interface and the cable 5 shown in FIG. 1 by using the communication link 33. The PC is thereby able to control the display device by software through the video interface. The control program may contain the control of image position, brightness, contrast, stretching and colour correction, the selection of the display mode, etc. Correspondingly, the CPU 32 may transfer various display device identification and status data to the PC 1.

When controlling the equipment the CPU 32 utilizes the device characteristics stored in the memory 34. The memory 34 is non-volatile, and it may be reprogrammable by the PC software through the communication link 33. The memory may contain parameters representing several different display modes, which parameters are utilized by the CPU 32 when the respective display mode is used. Typically, image positioning, display mode, contrast, brightness and colour correction parameters are stored in the memory 34.

The CPU 32 identifies the display mode used by the display adapter on the basis of the deflection signals it receives (their timings and polarities) and initiates the equipment according to the display mode. As mentioned above, the sampling frequency should be very close to the video frequency used by the display adapter to obtain a stable interference-free image by the A/D converter 36. As the video frequencies of the different display adapters may, however, deviate significantly from the nominal VGA video frequency, the interfacing equipment according to the invention has to be able to determine the video frequency of each video signal received by it with sufficient accuracy.

In the preferred embodiment of the invention, the CPU 32 calculates the video frequency by means of the horizontal deflection signal HSYNC received by it. It thereby utilizes the information that the horizontal resolution of the VGA display adapter (the active video period $H_{ACTIVE}$ in FIG. 2) comprises 640 pixels, that is, the length of the horizontal deflection period HPER corresponding to the video clock period is 800 pixels or video clock periods. The CPU calculates the time required for several horizontal deflection periods HPER of the received horizontal deflection signal HSYNC by means of an accurate internal reference clock signal of the equipment. The actual duration of the video clock period is obtained by dividing the calculated duration of the horizontal deflection period HPER by the predetermined number 800 of the video clock periods. The result indicates to what extent the video frequency used by the VGA display adapter deviates from the nominal video frequency of the above-mentioned VGA resolution. On the basis of this information the CPU 32 produces an appropriate register value for the control circuit 35 to be programmed and applies it to the control circuit 35. For instance, when the calculated length of the horizontal deflection period HPER is 31.778 microseconds (the deflection frequency being 31.468 kHz), the length of one video clock period is HPER/800=39.721 ns, which corresponds to the video frequency 25.175 MHz. If the horizontal deflection period HPER contains more or less than 800 pixels, the PC may transfer a new value to the CPU 32 through the communication link 33.

The control circuit 35 generates control signals synchronized with each other: a sampling clock SAMPLE of the A/D converter 36, a control clock LOAD of the output buffer 38, and a video clock CLOCK of the digital display 39, and deflection and control signals HSYNC', BLANK', VSYNC'. The control circuit 35 contains a phase-locked loop (PLL) and a voltage-controlled oscillator (VCO) 41. In the preferred embodiment of the invention, the PLL operates at a clock frequency 4×CLK four times the video frequency (n=4), and this clock frequency is synthesized by the VCO of the circuit 41 on the basis of the parameters supplied by the CPU 32. The frequency synthesis range is relatively narrow, being 24 to 29 MHz, so that a sufficiently stable clock frequency is obtained. To decrease the RFI interferences, the circuit 41 is preferably an integrated circuit, such as ICS1394, and the clock signal 4×CLK is used only within the circuit 41. The circuit 41 thereby also contains the registers required to generate the clock signal 4×CLK and the control signals CLOCK, SAMPLE and LOAD. The circuit 41 also contains a crystal XTAL which is used as a reference frequency in the synthesizing of the signal 4×CLK and as an accurate reference clock for the CPU 32. Before being applied to the circuit 41, the polarities of the received horizontal and vertical deflection signals HSYNC and VSYNC are set by a polarity adjusting circuit 44B in accordance with the internal polarities of the circuit 35 and synchronized by a digital synchronizing stage 45 with the internal clock signal of the circuit 35.

The circuit 35 also contains a deflection controller 43 which produces appropriate deflection signals HSYNC', VSYNC' and BLANK' for the display panel 39, the signals being synchronized with the received deflection signals HSYNC and VSYNC and consisting of the same elements HSYNC, HBP, $H_{ACTIVE}$, HFP, VSYNC, VBP, $V_{ACTIVE}$ and VFP as the CRT video signal illustrated in FIG. 2. The controller 43 contains the control registers to be used in the deflection. Due to the programmable deflection controller 43 it is easy to use different components (A/D, conversion circuit, FRC circuit) in the equipment and adapt the timings of the equipment to the used components. In the preferred embodiment of the invention the horizontal deflection signals HSYNC' and BLANK' are formed by a programmable number of the periods of the 4×CLK clock signal, and the horizontal synchronizing signal VSYNC' consists of a programmable number of horizontal deflection periods HPER. The polarities of the generated deflection signals are adapted by the polarity adjusting circuit 44A to each display panel 39.

The circuits 41, 43, 44A and 44B are controlled by parameters programmed in control registers 42 by the CPU 32 over a control bus 30.

As mentioned above, the circuit 41 operates at a frequency four times the video frequency, and so it is usually possible to synchronize all the signals generated by the circuit 35 with the horizontal deflection signal HSYNC at an accuracy at least one fourth of the video clock period. The clock periods of the sampling clock SAMPLE and the digital display 30 each consist of four periods of the basic clock 4×CLK (the original actual video frequency).

Figure 5:
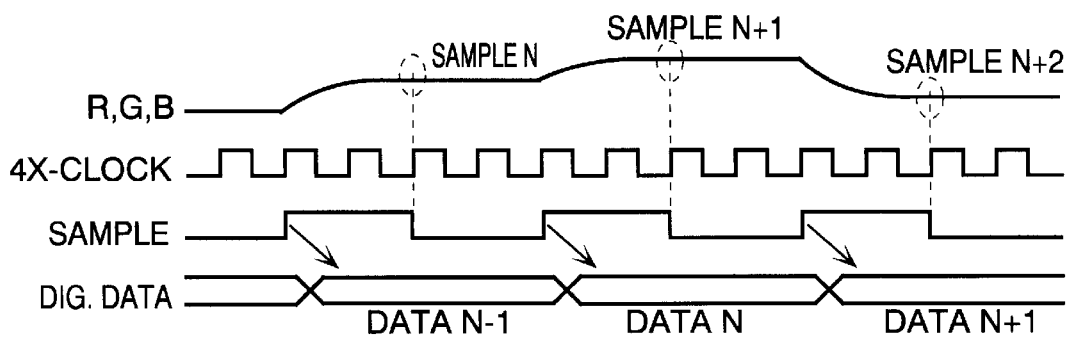
FIG. 5 is a timing diagram illustrating the sampling of an analog video signal.

Sampling of the analog signals R, G and B by the A/D converter is illustrated in FIG. 5. The A/D conversion is effected at a time determined by the circuit 35 by using the sampling clock signal SAMPLE so that the sampling will always take place at a stable portion of the video signal, which prevents the quantizing error and provides a stable flicker-free image on the screen. As shown in FIG. 5, this is effected by timing the rising front edge of the sampling pulse comprising two periods of the basic clock 4×CLK at the start of each video clock period, so that the falling back edge of the pulse, which activates the sampling, will fall in the middle of the video clock period at a stable signal point.

As the interfacing equipment shown in FIG. 3 is started at an arbitrary moment with respect to the status of the VGA display adapter (the deflection period of the received video signal), the control circuit 35 has to be able to automatically phase-lock the horizontal synchronizing pulse HSYNC' generated by it to the received horizontal synchronizing pulse HSYNC when changing the display mode or when starting the equipment, for instance. Another reason why this property is necessary is that the internal clock CLOCK of the equipment is not accurately equal to the video frequency of the received signal.

Figure 4:
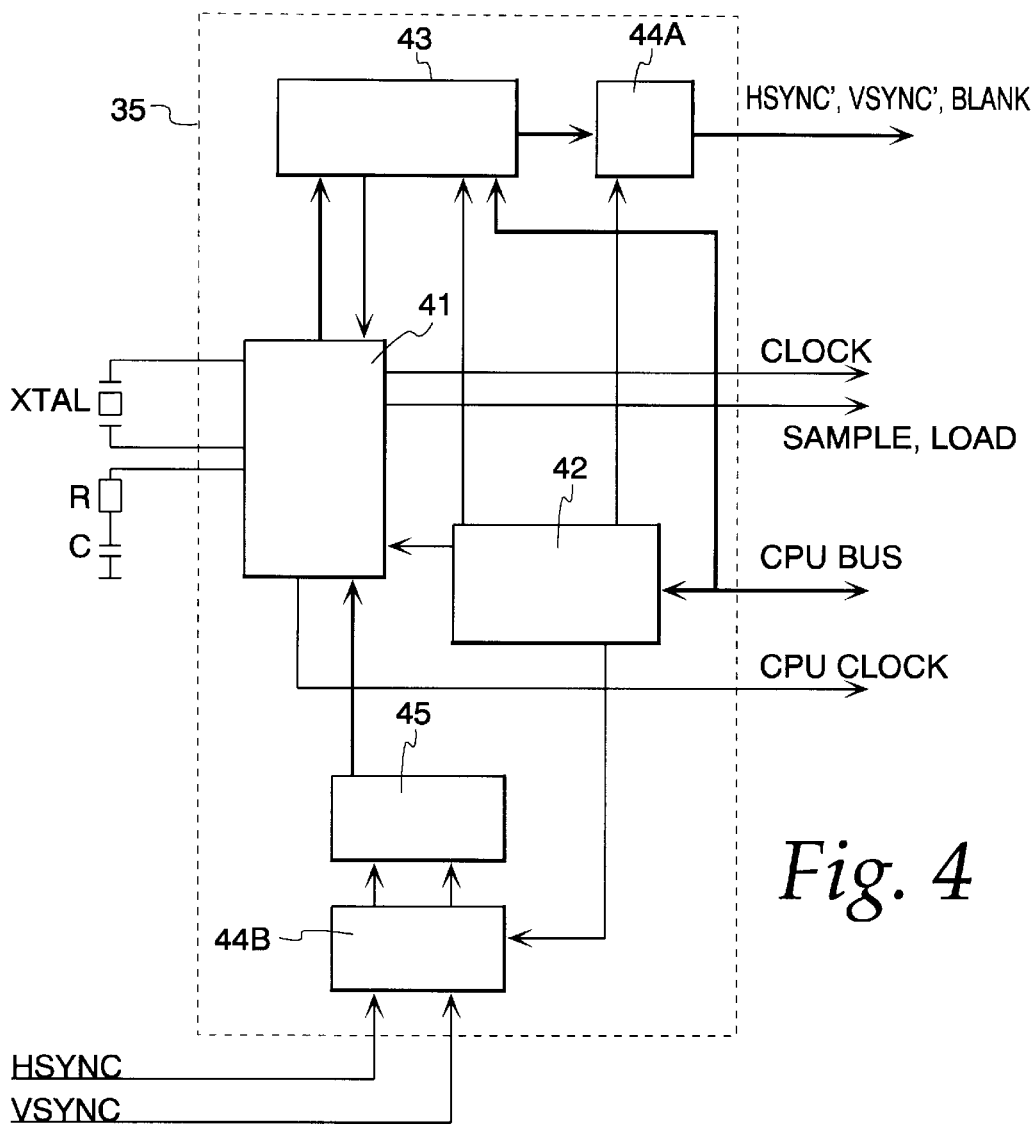
FIG. 4 is a block diagram illustrating the control unit of FIG. 3.
Figure 6:
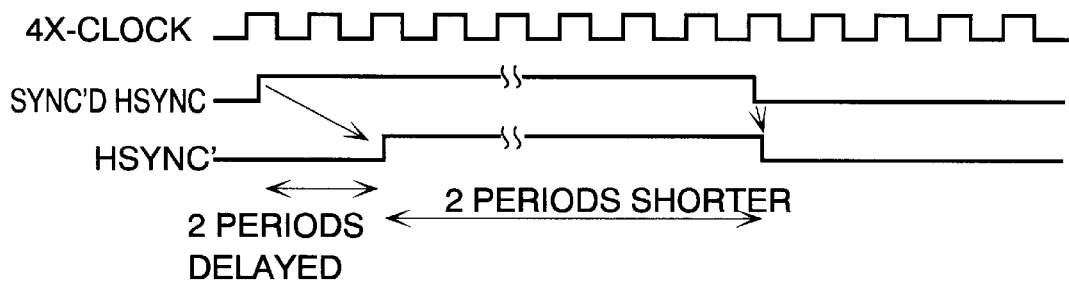
FIGS. 6, 7 and 8 are timing diagrams illustrating the synchronizing of the horizontal deflection signal.

Referring to FIG. 4, to effect the above-mentioned operation, the phase-locked loop of the circuit 41 compares the horizontal deflection pulse HSYNC received from 45 and synchronized with 4×CLK with the generated horizontal deflection pulse HSYNC' at the clock frequency 4×CLK. If the pulses HSYNC and HSYNC' are exactly at the same phase, no adjustments will be carried out. If the front edge of the pulse HSYNC' (change of state) occurs later than the front edge of the received pulse HSYNC, the phase of the deflection signals HSYNC', VSYNC' and BLANK' to be sent to the digital display 39 and that of the sampling signal SAMPLE and the signal LOAD is advanced by "stealing"

one or more of the clock pulses 4×CLK controlling the signals. In the case of FIG. 6, the front edge of the pulse HSYNC' is two 4×CLK periods behind, wherefore the above-mentioned phase shift is effected by shortening this pulse HSYNC' by two clock periods 4×CLK.

Figure 7:
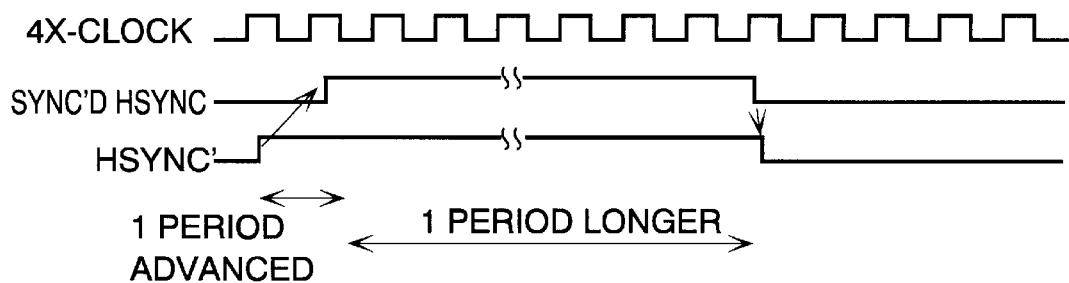

Correspondingly, when the pulse HSYNC' comes too early with respect to the pulse HSYNC, the phase of the above-mentioned control signals is delayed by adding to them one or more 4×CLK clock periods, as shown in FIG. 7.

An alternative solution to effect synchronization is that, instead of changing the number of the basic clock pulses, the phase-locked loop controls the VCO and thus the basic clock frequency. If the generated pulse HSYNC' is ahead of the synchronized pulse HSYNC, the duration of the period HPER is increased by decreasing the basic clock frequency. If the generated pulse HSYNC' is behind in time, the basic clock frequency is increased so that the duration of the period HPER is shortened.

The pulses HSYNC and HSYNC' are always compared at the front edge of the pulse HSYNC. The back edge of the deflection pulse HSYNC' is used to determine the position of the image on the display panel 39. The addition/removal of the clock pulses 4×CLK is performed after the comparison very rapidly during the same deflection pulse, and so the correction immediately applies to the ensuing deflection period HPER. In this way all the control signals generated by the control circuit 35 remain synchronized with the status of the received video signal and the image is displayed on the screen at the right position without interference.

Figure 8:
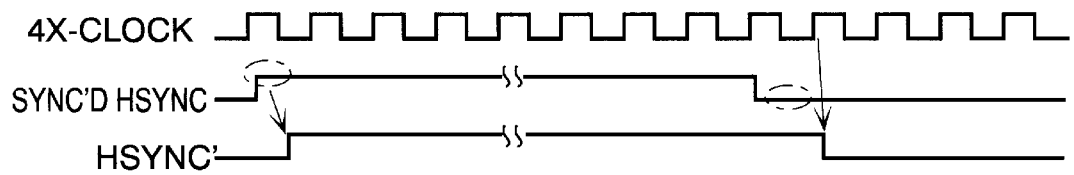

A simpler alternative way to effect synchronization is to use a synchronized HSYNC pulse in a controlled manner for setting a HSYNC' counter register contained in the deflection control circuit 43 and allowing the counter to operate after the termination of the pulse HSYNC, as shown in FIG. 8. In this way, the output of the counter produces a pulse HSYNC' equal in length to the controlling pulse HSYNC, while the phase difference between the pulses is no more than one period of the clock signal 4×CLK.

Figure 10:
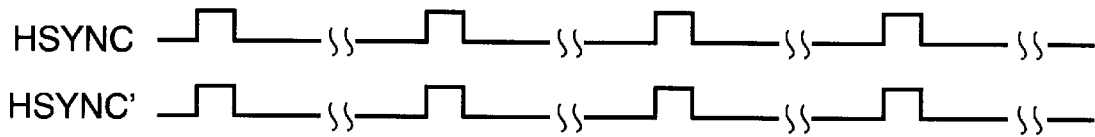
FIGS. 10 and 11 are timing diagrams illustrating the generation of horizontal synchronizing pulses in an uninterlaced and interlaced display mode, respectively.
Figure 11A:
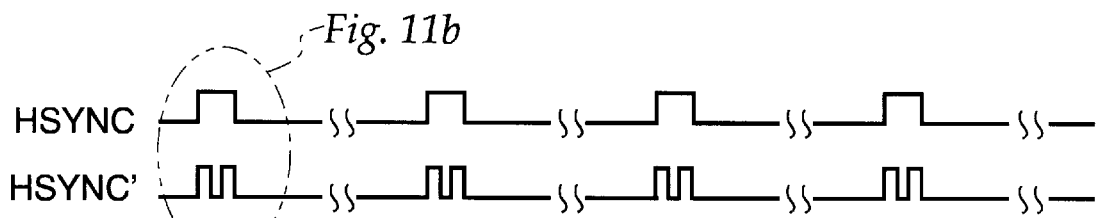
Figure 11B:
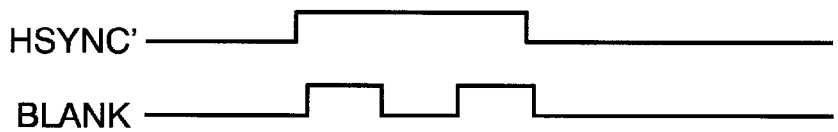

As mentioned above, the CPU 32 is able to identify different character modes and an interlaced display mode by means of the deflection signals HSYNC and VSYNC. In the interlaced display mode (used in the television, for instance), the even and odd lines of the image are produced separately during successive image fields. On detecting this mode, the CPU 32 programs the circuit 35 to produce, in place of one pulse of normal length, two pulses HSYNC' shorter than normally immediately in succession during each horizontal deflection period to cause the display panel 39 to shift its internal pointer onwards over one horizontal line. In this way the display device is made to operate in the interlaced display mode. FIGS. 10 and 11 show the generation of the pulses HSYNC' in an uninterlaced and interlaced display mode, respectively.

The VGA character modes usually comprise 720 pixels per horizontal line. In order that an adequate image quality could be achieved with a digital display panel able to display 640 pixels per horizontal line, every ninth pixel has to be omitted. The easiest way to accomplish this is to change the type font by the PC and start to use the resolution of 640 pixels on the VGA display adapter. Certain operating systems, such as OS/2, and application programs, however, require compatibility with the CRT displays (invariable VGA environment). In the interfacing equipment according to the invention, it is possible to achieve compatibility with these programs by leaving every ninth pixel of the received video signal undigitized. Practically this pixel does not contain any information, as it is used to separate the different characters from each other on the screen.

Figure 9:
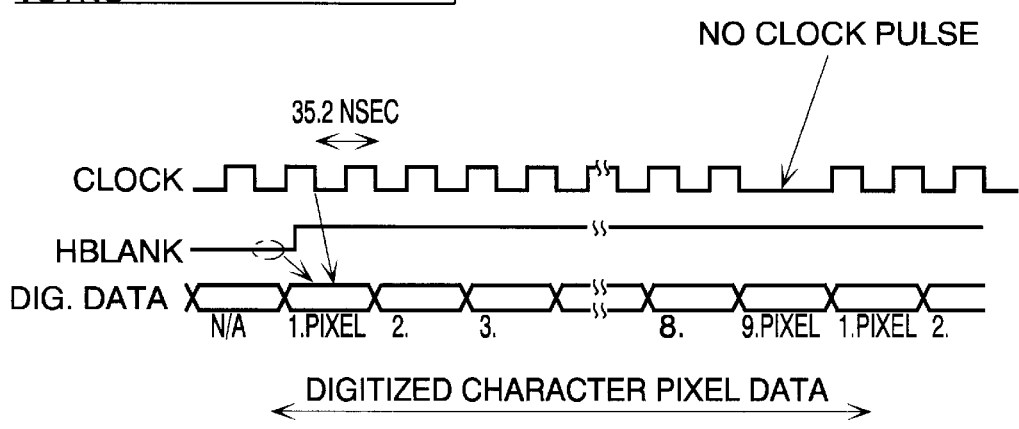
FIG. 9 is a timing diagram illustrating the removal of a pixel in the character mode.

On detecting a normal VGA character mode, the CPU 32 programs the circuit 35 to omit the sampling pulse at every ninth pixel and at the same time to remove the corresponding pulse of the video clock CLOCK of the display panel 39, beginning from the first pixel after the start of the period $H_{ACTIVE}$ of the signal HBLANK', as shown in FIG. 9. In lower-resolution display modes (e.g. 40×25 character mode), the corresponding pulses are omitted both at the 17th and 18th pixel, so that the corresponding display resolution of the display 39 is 360×400 in place of the original 720×400, and the size of the character in the horizontal direction is 16 pixels.

Figure 12A:
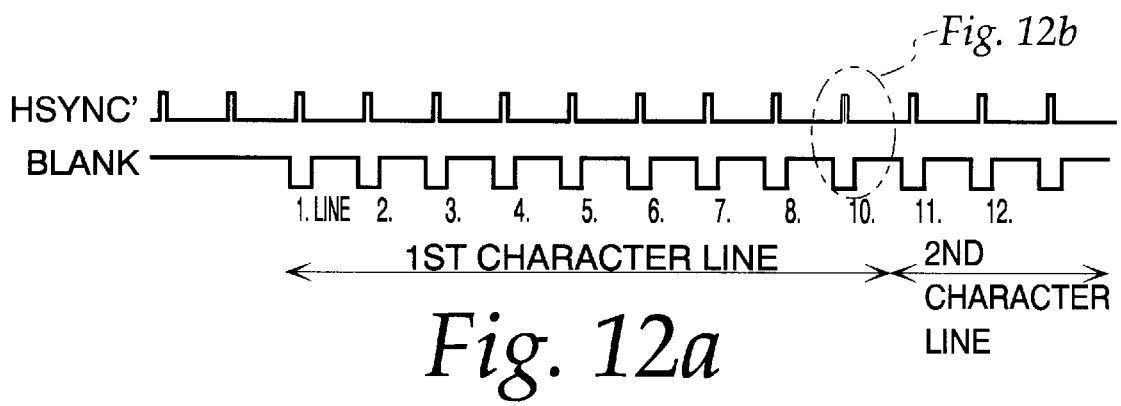
FIG. 12 is a timing diagram illustrating the stretching of an image.
Figure 12B:
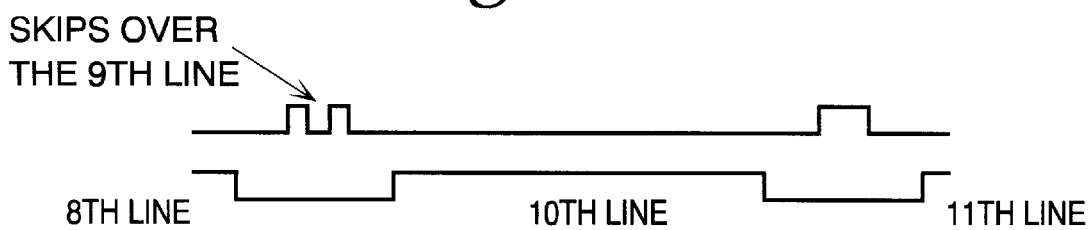

In the character mode the image displayed on the display 39 can be stretched by software in the vertical direction by generating one or more additional HSYNC' pulses e.g. on every ninth horizontal line, as shown in FIG. 12, similarly as in connection with the interlaced display mode. A typical VGA character area comprises 9×16 pixels, and thereby at least one additional pulse is generated e.g. on every 16th line. In this way, empty lines can be produced between the character lines in the character modes. The number m of the additional horizontal synchronizing pulses and the lines k on which they are generated can be selected in accordance with the character mode used and the desired stretching effect. For this purpose the deflection control circuit 43 comprises a line counter which generates additional HSYNC' pulses on reaching a value stored in a control register of the controller 43, the number of the additional pulses being determined by a parameter stored in another control register of the controller 43.

The A/D converter 36 used in the equipment can be any converter intended or suitable for digitizing video signals. Suitable circuits include Bt 252 or Bt 254, manufactured by Brooktree Corporation, San Diego, U.S.A. The former circuit comprises one A/D converter and the latter three parallel A/D converters. After the A/D converter there is connected a conversion memory addressable by a digitized video output for shaping the digitized output data. The conversion memory 37 may be contained in the integrated A/D converter circuit (Bt 252) or it may be a separate memory circuit. The conversion memory 37 contains a look-up table in which a respective output value is stored for each digitized video signal value, which output value is applied as a digital video signal to the display 39.

By means of the conversion memory 37, the brightness or the contrast can be changed on the screen by changing the content of the conversion memory 37. The A/D converter circuit Bt 254 contains six programmable D/A converters, by means of which the lower and upper digitizing limits (reference values for quantization) can be set for each video signal R, G, B. The above-mentioned change in brightness can also be effected by changing the voltage level of the lower digitizing limit while keeping the size of the voltage range to be digitized unchanged or by controlling the inverter (through the D/A converter 40). The change of contrast can be effected by keeping the lower limit constant and changing the range. The contrast of the display panel 39 itself is usually fixed to a certain value, which is difficult to change.

By means of the conversion memory 37, it is possible to effect, in addition to the brightness and contrast adjustment, the changes required by the interfacing of different panel types (different word widths) and the colour correction by software. The colour filters of a TFT-type LCD panel usually provide a slightly purple image with the same control parameters by which a CRT display produces a display quality very close to the original image. Such colour errors can be corrected (gamma correction) by the conversion memory 37, in addition to which it is possible to provide a positive image, effect images, etc.

Figure 13:
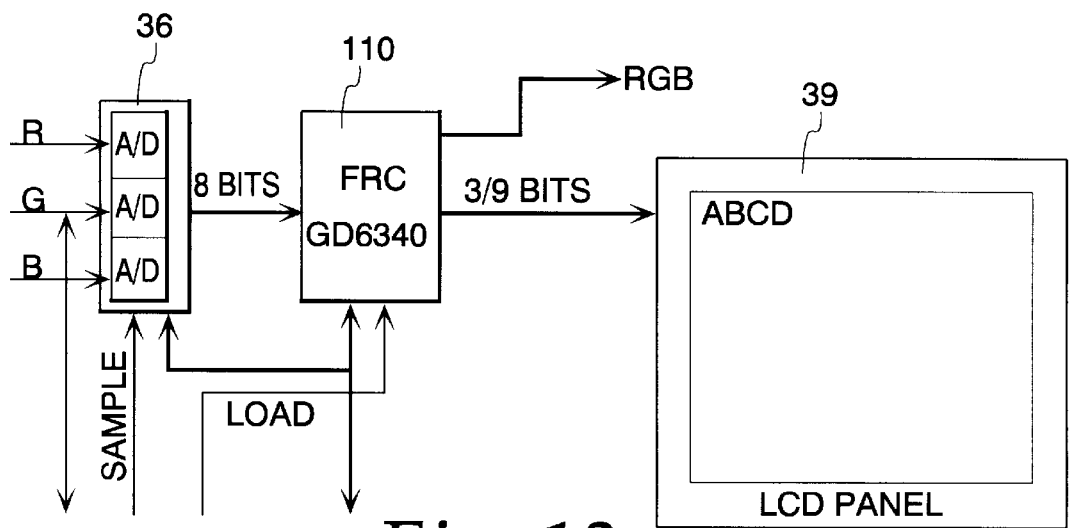
FIG. 13 is a block diagram illustrating the use of an FRC circuit for controlling a colour panel.

The conversion memory 37 can be replaced with a RAMDAC circuit designed for the control of LCD panels and usually used in VGA display adapters. One such circuit is GD 6340 manufactured by Cirrus-Logic, by means of which the number of colours displayable on the display 39 can be increased by using the FRC or dithering techniques. In certain cases, these techniques may be even more advantageous than a conventional conversion memory due to their higher integration level (less external components). One such alternative connection is shown in FIG. 13. The use of the above-mentioned GD 6340 circuit also enables the chaining of display devices, as the circuit supports both a digital display device control and a cathode ray tube control.

Figure 14:
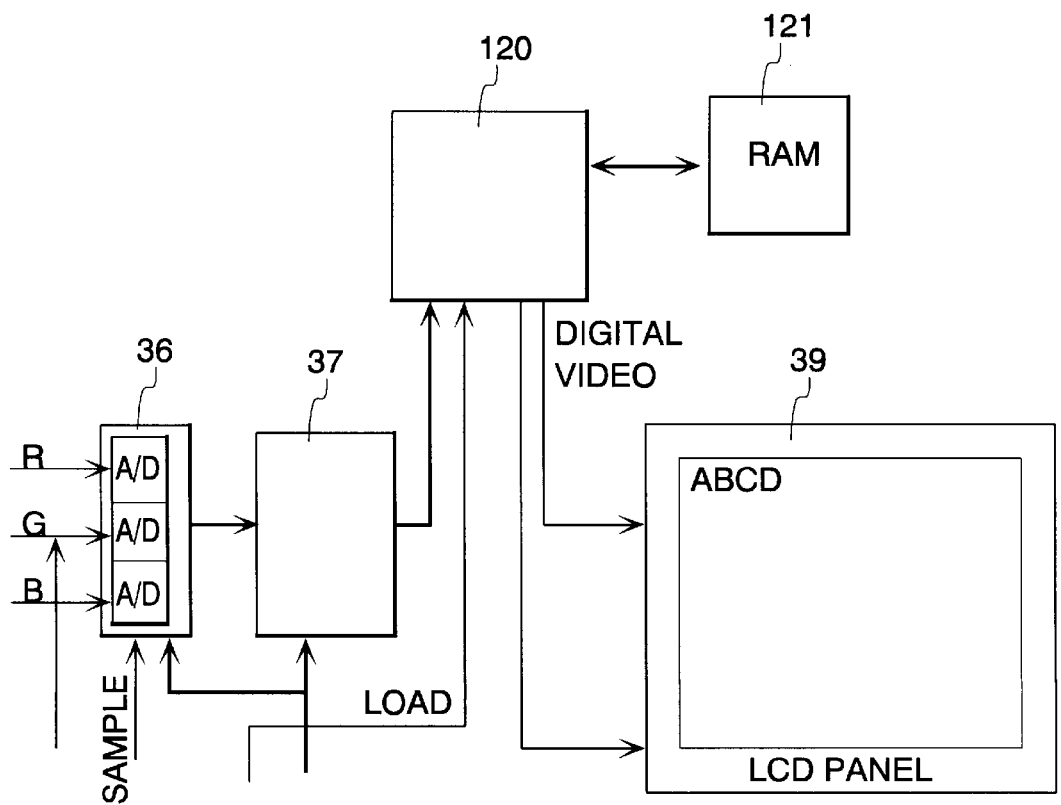
FIG. 14 is a block diagram in which an intermediate memory is used for controlling a monochrome display divided into two blocks.

Digital monochrome display panels (such as Sharp LM64148Z) are usually divided into two blocks (1/240 duty ratio), which have to be addressed simultaneously. FIG. 14 shows a connection suitable for the control of this kind of display panel, in which an additional controller 120 and an intermediate memory 121 are connected between the conversion memory 37 and the display panel 39. The controller 120 stores the digital video data provided by the conversion memory 27 in the intermediate memory 121 and reads the data from the intermediate memory 121 in a manner required by the timing and addressing mechanism of the monochrome display and supplies the data to the display panel 39.

It is further possible to incorporate in the interfacing equipment according to the invention functions by means of which the user is able to perform, through the communication link 33, various image adjustments by the keyboard or the mouse of the PC by software e.g. as disclosed in Finnish Patent Application 914435 or through an external device interface 32A, to which e.g. a keyboard, control panel, mouse, inverter, control potentiometers for manual adjustments, etc., can be connected for control or data transmission.

The alignment of the image on the screen can be effected e.g. in the following way. A bit map is stored in the memory of the display adapter of the PC, which map forms a rectangle which follows the contours of the active image on the screen. By using the keyboard, the mouse or some other external device, such as a control panel, the image can be displaced on the screen by giving a command by the PC software to the CPU 32 to displace the image by one 4×CLK clock period to the right or to the left (similarly, by one line up or down in the vertical direction). The CPU 32 displaces the image by reprogramming the control registers of the deflection controller 43 of the control circuit 35 so that they correspond to the new image position. The use of this control program requires a more thorough knowledge of the device from the user; on the other hand, the image can be positioned with a still greater accuracy and reliability.

The frequency deviation of the frequency synthesizer VCO of the control circuit 35 can also be made more accurate by storing a bit map in the memory of the display adapter of the PC, which map forms a dot lattice on the display 39 close to the right edge of the image. When the frequency of the voltage-controlled frequency generator is changed, the dots in the lattice start to flicker when the sampling frequency deviates excessively from the video frequency used by the PC display adapter. By alternating the sampling frequency between a lower and a higher value by the software of the CPU 32, the optimum frequency at which there occurs no flickering in the displayed image can be searched out. This way of adjustment is very suitable in cases where the timings do not comply with the de facto standards.

After the image has been aligned in a desired manner, the CPU 32 can, if desired, be instructed to store the data concerning the timing in the memory 34. In an error situation the image can be restored to the initial position or to the default value position by quick selection (e.g. by pressing a key in the PC).

With certain display adapter circuits, the image may be displayed in different positions in different modes even in the same timing mode. This does not cause problems with a CRT display as the difference on the screen is insignificant. With the digital display panel 39, however, it causes the image to be displaced to the left or to the right so that a pixel group corresponding to the delay in the edge area of the image will not be displayed on the screen. The delay is due to the different internal switching paths of the display adapter in different display modes. For instance, the most widely used VGA character mode 3+ uses a 720×400 resolution but the same timing mode as the graphics mode 6 (640×200). The operation of the display adapter circuit varies greatly from one mode to another, and the images may be positioned on the screen in different ways, as described above.

In the equipment according to the invention, the problem can be solved e.g. by incorporating a communication request in the device software of the PC controlling the change of the display mode. The communication request gives the interfacing equipment according to the invention accurate information about the used display mode. The CPU 32 searches the memory 34 for the image positioning parameters corresponding to this display mode and programs the image adjusting registers of the control circuit 35 so that they correspond to these parameters. The device software of the PC may be stored in the EPROM memory of the PC or in the system memory as a terminate and stay resident program (TSR).

It is also easy to incorporate user or application specific adjusting values in the software of the CPU 32, which values are taken into use when the user changes or an application is started.

The interface according to the invention can be applied in the testing of analog display adapters by replacing the digital display with a computer. During one image field the video signal of the adapter is digitized by the interface according to the invention and a sum term is calculated from the digitized image information, which sum term deviates from the sum term calculated for the test image if there is a failure in the display adapter.

The figures and the description related to them are only intended to illustrate the present invention. In its details, the analog video interface according to the invention may vary within the scope of the attached claims.

I claim:

1. Analog video interface for a digital video display, comprising an analog video input for receiving at least one analog video signal having a video frequency and having composite or separate horizontal and vertical deflection signals;

digitizing means for digitizing said at least one analog video signal;

means for generating a basic clock signal having a frequency which is at least n times a desired video frequency, where $n \geq 1$;

means for generating control signals for the digital display and a sampling clock signal for the digitizing means in synchronization with the basic clock signal;

means for determining the video frequency of the analog video signal on the basis of said received signals; and said means for generating the basic clock signal comprises a programmable frequency synthesizer means responsive to said determining means for synthesizing the basic clock signal of a frequency which is at least n times said determined video frequency, where $n \geq 1$ and wherein a sampling clock period of the digital display comprises n basic clock periods; an active edge of the sampling pulse is timed to coincide with a stable invariable moment of the analog video signal; a horizontal deflection period and a horizontal synchronizing pulse of the digital video display are formed by a programmable number of basic clock periods; and a vertical deflection period and a vertical synchronizing pulse are formed by a programmable number of horizontal deflection periods.

2. Video interface according to claim 1, wherein the means for determining the video frequency comprise a calculating means for calculating the length of a deflection period of the received horizontal and/or vertical deflection signal and dividing the deflection period by a predetermined number of video frequency periods, and for programming the frequency synthesizer means to generate a corresponding n times greater basic clock frequency.

3. Video interface according to claim 2, wherein said predetermined number of video frequency periods is programmable so that it corresponds to each received video signal either automatically or by the action of the user.

4. Video interface according to claim 1, wherein a control means compares the received horizontal synchronizing pulse with the generated horizontal synchronizing pulse at said basic clock frequency and synchronizes the horizontal synchronizing pulses by decreasing or increasing the number of the basic clock periods contained in the generated horizontal synchronizing pulse instantaneously by one or more periods if a front edge of the generated horizontal synchronizing pulse occurs later or earlier, respectively, than the front edge of the received horizontal synchronizing pulse.

5. Video interface according to claim 4, wherein the control means comprises a counter means clocked by the basic clock and positively controlled by the received horizontal deflection signal for generating a horizontal synchronizing pulse.

6. Video interface according to claim 1, wherein a control means compares the received horizontal synchronizing pulse with the generated horizontal synchronizing pulse at said basic clock frequency and synchronizes the horizontal synchronizing pulses by adjusting the basic clock frequency.

7. Video interface according to claim 1, wherein the received analog video signal is in an interlaced display mode, and each generated horizontal deflection period contains two successive horizontal synchronizing pulses.

8. Video interface according to claim 1, wherein the received analog video signal complies with a character mode, and that every kth horizontal deflection period contains m additional horizontal synchronizing pulses for achieving an image stretching effect, where k and m are programmable parameters.

9. Video interface according to claim 1, wherein the resolution of the digital display is a first plurality ($N_1$) of pixels per horizontal line, and that the received analog video signal complies with a character mode in which there are a second plurality ($N_2$) of pixels per horizontal line, where $N_1 < N_2$, and that the control means removes at least every 9th or every 17th and 18th pixel from each horizontal line by omitting the corresponding clock pulse controlling the display.

10. Video interface according to claim 1, wherein the control means comprises a data transmission means for data transmission with a computer, for inputting the user's commands, through a video input.

11. Video interface according to claim 1, wherein the video interface comprises a user interface for giving the user's commands, and a control means performs a desired image adjustment on the screen in response to the user's commands.

12. Video interface according to claim 1, wherein the video interface comprises a user interface for inputting the user's commands, and a control means adjusts, in response to the user's commands, the basic clock frequency generated to remove interferences occurring in the image displayed on the screen.

13. Video interface according to claim 1, wherein the video interface comprises a memory in which the information required to adjust the image is stored for different display modes.

14. Video interface according to claim 1, wherein the digitizing means comprises an A/D converter for digitizing said at least one video signal, and a control means adjust the brightness and/or contrast level on the screen of the digital display by varying the voltage level of the lower digitizing limit of at least one A/D converter and/or the size of the voltage range to be digitized.

15. Video interface according to claim 1 or 14 wherein the digitizing means has an associated conversion memory means addressable by a digitized video output of an A/D converter and preferably programmable by a control means for producing shaped digitized output data, and the conversion memory means preferably performs a brightness, contrast, color and/or word length correction on the digitized video signal according to the properties of the digital video display to be controlled.

16. Video interface according to claim 1, wherein the digitizing means has an associated means addressable by a digitized video output of an A/D converter for increasing the number of displayed colours by an FRC or dithering technique.

17. Video interface according to claim 1, wherein the digital display is a display divided into two simultaneously addressable blocks, and that an intermediate memory for video data and means for addressing the intermediate memory and the display are provided between the digitizing means and the display for supplying video data from the intermediate memory to the display.

18. Video interface according to claim 1, wherein the video interface comprises means (110) for chaining displays.

* * * * *